(12) United States Patent
Azadet

(10) Patent No.: US 8,121,062 B2
(45) Date of Patent: Feb. 21, 2012

(54) METHOD AND APPARATUS FOR CROSS-TALK CANCELLATION IN FREQUENCY DIVISION MULTIPLEXED TRANSMISSION SYSTEMS

(75) Inventor: Kameran Azadet, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 401 days.

(21) Appl. No.: 12/020,722

(22) Filed: Jan. 28, 2008

(65) Prior Publication Data
US 2008/0117805 A1    May 22, 2008

Related U.S. Application Data

(63) Continuation of application No. 10/219,906, filed on Aug. 15, 2002, now Pat. No. 7,362,719.

(60) Provisional application No. 60/366,923, filed on Mar. 22, 2002.

(51) Int. Cl.
*H04B 5/16* (2006.01)

(52) U.S. Cl. ......................................... 370/286; 375/152

(58) Field of Classification Search .................... None
See application file for complete search history.

(56) References Cited

U.S. PATENT DOCUMENTS

| | | | |
|---|---|---|---|
| 5,930,231 A | 7/1999 | Miller et al. | |
| 6,137,839 A | 10/2000 | Mannering et al. | |
| 6,160,588 A * | 12/2000 | Ma et al. | 348/491 |
| 6,246,716 B1 * | 6/2001 | Schneider | 375/220 |
| 6,298,098 B1 * | 10/2001 | Krasner et al. | 375/317 |
| 6,351,500 B2 * | 2/2002 | Kumar | 375/270 |
| 6,417,945 B2 | 7/2002 | Ishikawa et al. | |
| 6,445,733 B1 * | 9/2002 | Zuranski et al. | 375/231 |
| 6,456,657 B1 * | 9/2002 | Yeap et al. | 375/240.12 |
| 6,477,207 B1 | 11/2002 | Lindholm | |
| 6,519,773 B1 * | 2/2003 | Ahmed et al. | 725/118 |
| 6,549,512 B2 | 4/2003 | Wu et al. | |
| 6,624,766 B1 | 9/2003 | Possley et al. | |
| 6,771,198 B2 | 8/2004 | Azadet | |
| 6,987,800 B2 | 1/2006 | Nordstrom et al. | |
| 6,999,504 B1 * | 2/2006 | Amrany et al. | 375/222 |
| 7,020,218 B2 | 3/2006 | Arnesen | |
| 7,076,168 B1 | 7/2006 | Shattil | |
| 7,154,914 B1 * | 12/2006 | Pechner et al. | 370/516 |
| 7,158,563 B2 | 1/2007 | Ginis et al. | |
| 2002/0039211 A1 | 4/2002 | Shen et al. | |
| 2005/0220180 A1 | 10/2005 | Barlev et al. | |
| 2007/0025421 A1 * | 2/2007 | Shattil | 375/136 |

* cited by examiner

*Primary Examiner* — Phirin Sam
(74) *Attorney, Agent, or Firm* — Ryan, Mason & Lewis, LLP

(57) ABSTRACT

A method and apparatus are disclosed for canceling cross-talk in a frequency-division multiplexed communication system. The disclosed frequency-division multiplexed communication system employs multiple carriers having overlapping channels and provides an improved cross-talk cancellation mechanism to address the resulting interference. Bandwidth compression is achieved using n level amplitude modulation in each frequency band. An FDM receiver is also disclosed that decomposes the received broadband signal into each of its respective frequency bands and returns the signal to baseband in the analog domain. Analog requirements are relaxed by removing cross-talk from adjacent R-F channels, from image bands, and minimizing the performance degradation caused by In-phase and Quadrature-phase (I/Q) phase and gain mismatches in modulators and demodulators. The disclosed transmitter or receiver (or both) can be fabricated on a single integrated circuit.

13 Claims, 10 Drawing Sheets

METHOD AND APPARATUS FOR CROSS-TALK CANCELLATION IN FREQUENCY DIVISION MULTIPLEXED TRANSMISSION SYSTEMS

CROSS REFERENCE TO RELATED APPLICATIONS

This application is a continuation of U.S. patent application Ser. No. 10/219,906, filed Aug. 15, 2002, now U.S. Pat. No. 7,362,719 which claims the benefit of U.S. Provisional Application Ser. No. 60/366,923, filed Mar. 22, 2002, each incorporated by reference herein.

FIELD OF THE INVENTION

The present invention relates generally to cross-talk cancellation techniques, and more particularly, to methods and apparatus for reducing cross-talk in frequency division multiplexed (FDM) communication systems.

BACKGROUND OF THE INVENTION

The explosive growth of digital communications technology has resulted in an ever-increasing demand for bandwidth for communicating digital information, such as data, audio and/or video information. To keep pace with the increasing bandwidth demands, new or improved network components and technologies must constantly be developed to perform effectively at the ever-increasing data rates. In optical communication systems, however, the cost of deploying improved optical components becomes prohibitively expensive at such higher data rates. For example, it is estimated that the cost of deploying a 40 Gbps optical communication system would exceed the cost of existing 10 Gbps optical communication systems by a factor of ten. Meanwhile, the achievable throughput increases only by a factor of four.

Thus, much of the research in the area of optical communications has attempted to obtain higher throughput from existing optical technologies. For example, a number of techniques have been proposed or suggested to employ multi-carrier transmission techniques over fiber channels. Conventional multi-carrier transmission techniques, however, space the multiple carriers so that they do not interfere with one another. The required carrier spacing, however, leads to poor spectral efficiency and thus limits the throughput that can be achieved frequencies to minimize interference. A system employing orthogonal carrier frequencies, however, will require an all-digital implementation that is particularly challenging with existing analog-to-digital and digital-to-analog converters at optical rates (10 Gbps and higher).

A need therefore exists for a multi-carrier transmission technique that provides improved spectral efficiency and allows for an analog implementation. Among other benefits, improved spectral efficiency will allow greater tolerance to dispersion and the use of generic and available optical technologies.

SUMMARY OF THE INVENTION

Generally, a method and apparatus are disclosed for canceling cross-talk in a frequency-division multiplexed communication system. The disclosed frequency-division multiplexing communication system employs multiple carriers having overlapping channels and provides an improved cross-talk cancellation mechanism to address the resulting interference. Generally, the carrier spacing of the multiple carriers can approach the Nyquist limit. Another feature of the invention achieves bandwidth compression using n level amplitude modulation in each frequency band. The multilevel signaling improves spectral efficiency by a factor of $\log_2 n$, at the expense of a higher signal-to-noise ratio (SNR) requirement.

According to another feature of the invention, an FDM receiver is disclosed where the received broadband signal is decomposed into each of its respective frequency bands and returned to baseband all in the analog domain. In order to relax the analog requirements, a digital cross-talk canceller is also disclosed that removes cross-talk from adjacent RF channels, from image bands, and minimizes the performance degradation caused by In-phase and Quadrature-phase (I/Q) phase and gain mismatches in modulators and demodulator's. The disclosed transmitter or receiver (or both) can be fabricated on a single integrated circuit.

A more complete understanding of the present invention, as well as further features and advantages of the present invention, will be obtained by reference to the following detailed description and drawings.

DETAILED DESCRIPTION

Figure 1:
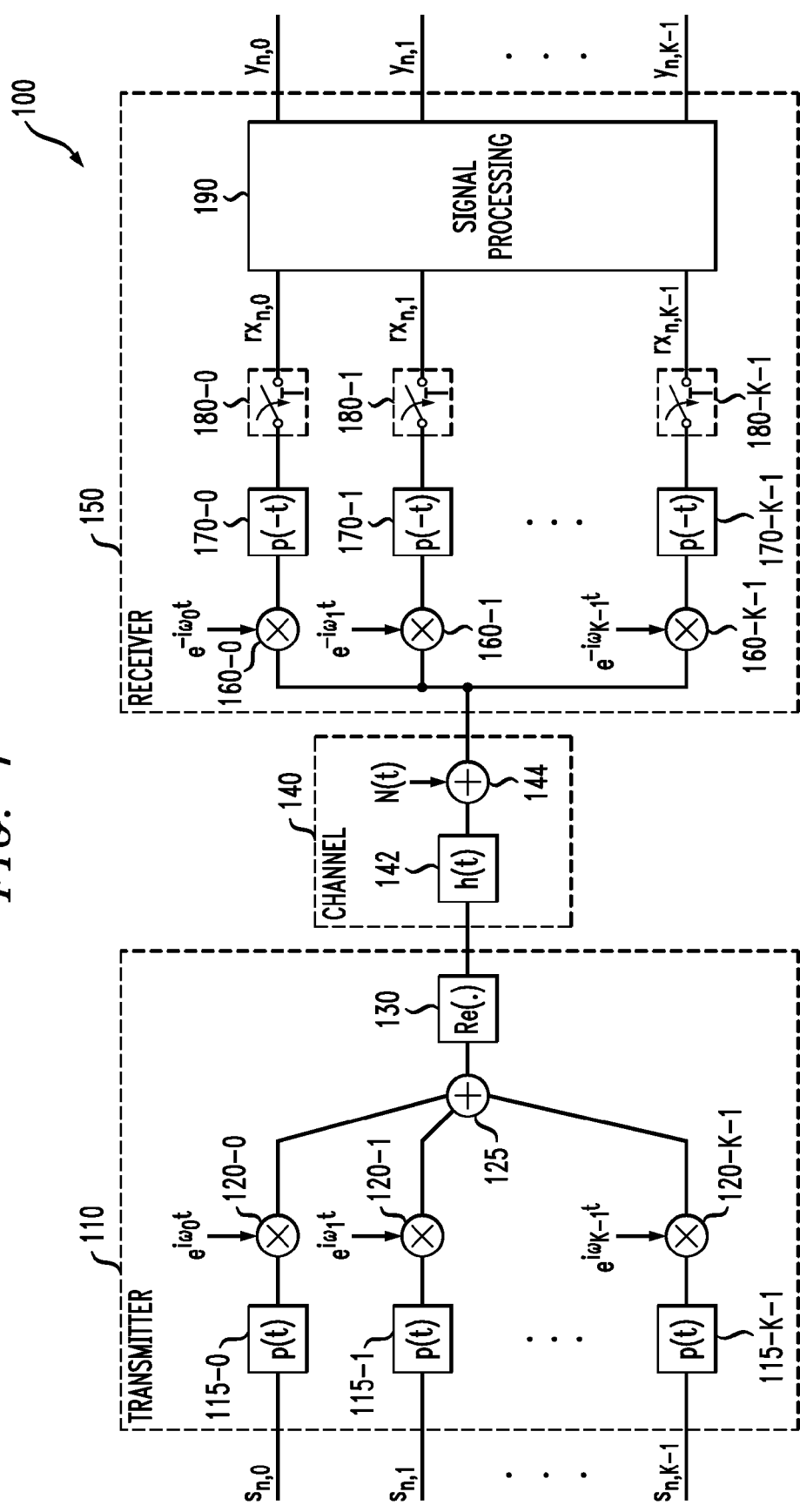
FIG. 1 illustrates a frequency-division multiplexing (FDM) system in which the present invention can operate.

FIG. 1 illustrates a frequency-division multiplexing (FDM) system 100 in which the present invention can operate. According to one aspect of the invention, the exemplary frequency-division multiplexing (FDM) system 100 employs multiple carriers with arbitrary carrier frequencies having carrier spacings that are close to the Nyquist limit. The present invention also achieves bandwidth compression by making use of n point (constellation) amplitude modulated transmission in each frequency band. The multi-level signaling improves spectral efficiency by a factor of $\log_2 n$, at the expense of a higher signal-to-noise ratio (SNR) requirement.

In one exemplary implementation of a 40 Gbps system, there are 16 quadrature amplitude modulated (QAM) constellations (four levels each for in-phase and quadrature-phase bands) having 2.5 Gbps per carrier frequency. In this system, each channel requires a bandwidth greater than 622 MHz (the baud rate per channel is 622 Mbaud). Therefore, the total bandwidth must be slightly greater than 10 GHz (16×622 MHz). Thus, the multi-channel QAM transmission scheme can provide a 40 Gbps throughput using only 10 Gbps optical components. The present invention recognizes that while the close spacing of each carrier exhibits excellent spectral efficiency, cross-talk will be introduced in the received signal. Thus, another aspect of the invention provides an improved cross-talk cancellation mechanism.

As shown in FIG. 1, K input broadband RF signals, $S_{n,0}$ through $S_{n,K-1}$, each corresponding to one of K frequency bands, are received at an input of a transmitter 110. Each of the K input signals are applied to pulse shaping filters p(t) 115-0 through 115-K-1 and then converted to the corresponding carrier frequency using an array of input multipliers 120-0 through 120-K-1. The K carrier frequency signals are then added by an adder 125 and typically only the real component is transmitted (please note that for single sideband (SSB) signals, both real and imaginary signals can be used) before being filtered to extract the real components at stage 130. The signal is then transmitted over a channel 140 that is represented as a band-limited filter 142 and an adder 144 that introduces noise, N(t).

The transmitted signal is received by a receiver 150. As shown in FIG. 1, the broadband RF signal is received at an input of the receiver 150. The input broadband signal is then decomposed into K frequency bands and returned to baseband using an array of input multipliers 160-0 through 160-K-1. Thereafter, each of the K baseband signals is filtered by a corresponding matched pulse shaping filter p(−t) 170-0 through 170-K-1 and sampled by a corresponding switch 180-0 through 180-K-1 at a sampling period, T, to produce the sampled signal elements, $rx_{n,0}$ through $rx_{n,K-1}$. A Fourier transform is applied to the sampled signal elements by a signal processor 190 to produce the digitized signal $y_{n,0}$ through $y_{n,K-1}$ (K samples at a time).

Figure 2:
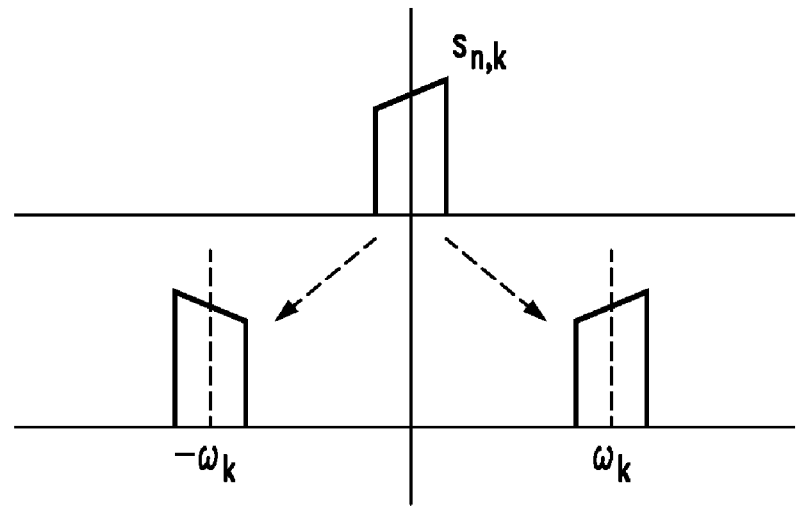
FIG. 2 illustrates a desired band and image bands at the frequency $\omega_k$ and $t-\omega_k$, respectively, that result from the modulation of a symbol $s_{n,k}$.

Let tx(t) be the transmit signal:

$$tx(t) = 2\text{Re}\left(\sum_n p(t-nT)\sum_k s_{n,k}e^{i\omega_k t}\right)$$

$$tx(t) = \sum_n \left(p(t-nT)\sum_k (s_{n,k}e^{i\omega_k t} + s^*_{n,k}e^{-i\omega_k t})\right)$$

where $s_{n,k}$ is the nth symbol transmitted on the carrier k:

Thus, as shown in FIG. 2, when the symbol $s_{n,k}$ is modulated, you get the desired main signal at the carrier frequency $\omega_k$ and the corresponding image band at the frequency $-\omega_k$. The received signal $rx_j(t)$ on carrier j can be written (for the case of a perfect channel 140):

$$rx_j(t) = \int tx(u)e^{-i\omega_j u} \cdot p(-(t-u))du$$

Figure 3:
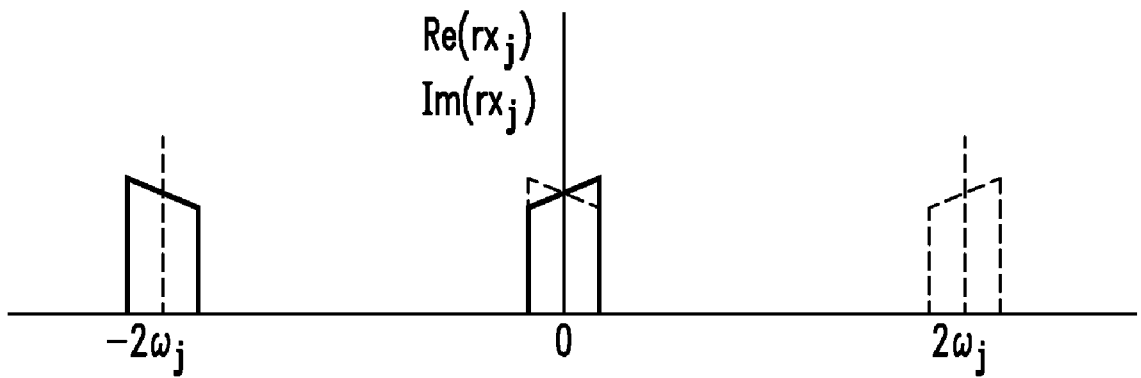
FIG. 3 illustrates the return of a carrier frequency, $\omega_j$, to baseband and the resulting image signal at $2\omega_j$.

FIG. 3 illustrates the return of a carrier frequency, $\omega_j$, to a baseband signal and the resulting image signal at $2\omega_j$. The resulting image band signal is generally filtered using an analog filter. The received signal $rx_j(t)$ can be expressed as follows:

$$rx_j(t) = \sum_n \sum_k \left[ s_{n,k}\int p(u-nT)p(-t+u)e^{-i(\omega_j-\omega_k)u}du + \right.$$

$$\left. s^*_{n,k}\int p(u-nT)p(-t+u)e^{-i(\omega_j+\omega_k)u}du \right]$$

$$rx_j(t) = \sum_n \sum_k \left[ s_{n,k}e^{i(\omega_j-\omega_k)nT}\int p(v)p(nT-t+v)e^{-i(\omega_j-\omega_k)v}dv + \right.$$

$$\left. s^*_{n,k}e^{i(\omega_j+\omega_k)nT}\int p(v)p(nT-t+v)e^{-i(\omega_j+\omega_k)v}dv \right]$$

The values a(t) and b(t) are defined as follows:

$$a_{j,k}(t) = \int p(v)p(v-t)e^{-i(\omega_j-\omega_k)v}dv$$

$$b_{j,k}(t) = \int p(v)p(v-t)e^{-i(\omega_j+\omega_k)v}dv$$

The receive signal $rx_j(t)$ is then written in a more compact form:

$$rx_j(t) = \sum_n \sum_k \left[ a_{j,k}(t-nT)e^{i(\omega_j-\omega_k)nT}s_{n,k} + b_{j,k}(t-nT)e^{i(\omega_j+\omega_k)nT}s^*_{n,k} \right]$$

where the first term represents the main signal and cross-talk with other carriers and the second term represents the image bands after demodulation. The second term may be negligible if receive filters are very selective, or for particular choices of the carrier frequencies $\omega j$.

The sampled receive signal $rx_j(mT)$ is given by, $$rx_j(mT) =$$

$$\sum_n \sum_k \left[ a_{j,k}((m-n)T)e^{i(\omega_j-\omega_k)nT}s_{n,k} + b_{j,k}((m-n)T)e^{i(\omega_j+\omega_k)nT}s^*_{n,k} \right]$$

Figure 4:
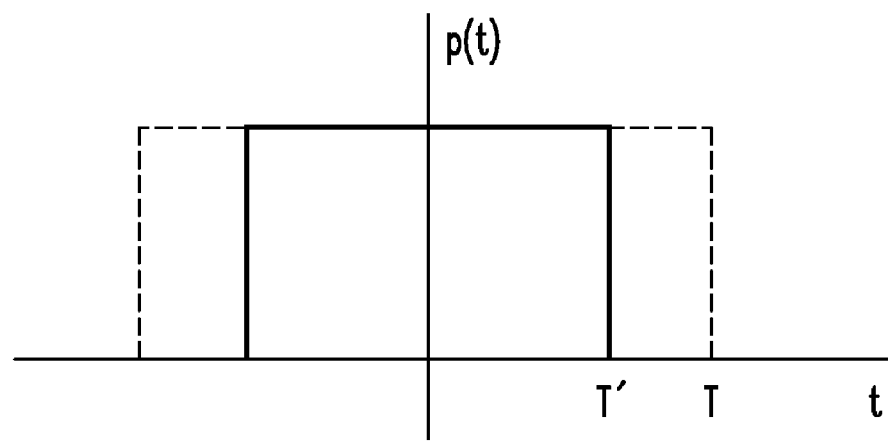
FIG. 4 illustrates an exemplary matched filter p(t) that may be employed in the transmitter of FIG. 1.

A convenient simplification is obtained when assuming that the shaping filter's impulse response p(t) has a finite duration T (T=baud-period):

$a_{j,k}((m-n)T)=0$ if m≠n $a_{j,k}((m-n)T)=a_{j,k}$ if m=n $b_{j,k}((m-n)T)=0$ if m≠n $b_{j,k}((m-n)T)=a_{j,k}$ if m=n $rx_j(mT)$ is therefore expressed in the simplified form:

$$rx_j(mT) = \sum_k \left[ a_{j,k}e^{i(\omega_j-\omega_k)mT}s_{m,k} + b_{j,k}e^{i(\omega_j+\omega_k)mT}s^*_{m,k} \right]$$

where:

$a_{j,k} = \int p^2(v)e^{-i(\omega_j-\omega_k)v}dv$ $b_{j,k} = \int p^2(v)e^{-i(\omega_j+\omega_k)v}dv$ The pulse shaping filters p(t) in the transmitter 110 and the corresponding matched filters p(−t) in the receiver may be embodied as rectangular functions of duration T' (where T'≦T) or as square toot raised cosine filters of period TI, and excess bandwidth α. When the pulse shaping filters p(t) and corresponding matched filters p(−t) are embodied as rectangular functions of duration T' (where T'≦T), in an exemplary return-to-zero (RZ) transmitter and an "integrate and dump" receiver, the filter p(t), shown in FIG. 4, can be expressed as follows (assuming ISI free):

$$p(t) = \Pi_T(t) \quad T' \leq T$$

where:

$$\Pi_T(t) = \begin{cases} 1 & \text{if } -T'/2 \leq t \leq +T'/2 \\ 0 & \text{otherwise} \end{cases}$$

The value of a can be computed (and similarly b) as follows:

$$a_{j,k}(mT) = \int \Pi_{T'}(v)\Pi_{T'}(v-mT)e^{-i(\omega_j-\omega_k)v} dv$$

If a is 0 and m is non zero, the following is true:

$$a_{j,k}(0) = \int \Pi_{T'}(v)\Pi_{T'}(v)e^{-i(\omega_j-\omega_k)v} dv =$$

$$\int_{-T'/2}^{+T'/2} e^{-i(\omega_j-\omega_k)v} dv = \left[\frac{e^{-i(\omega_j-\omega_k)v}}{-i(\omega_j-\omega_k)}\right]_{v=-T/2}^{v=+T/2}$$

$$a_{j,k}(0) = T' \frac{e^{+i(\omega_j-\omega_k)T/2} - e^{-i(\omega_j-\omega_k)T/2}}{2i(\omega_j-\omega_k)T'/2} =$$

$$T' \frac{\sin((\omega_j-\omega_k)T'/2)}{(\omega_j-\omega_k)T'/2} = T' \text{sinc}((\omega_j-\omega_k)T'/2)$$

Thus, if $\omega_k$ equals $k\omega_{T'}$ (where $\omega_{T'}=2\pi/T'$), then:

$$a_{j,k}(mT) = \delta_{j,k}\delta_m$$

$$b_{j,k}(mT) = 0$$

In this case, the basis functions are orthogonal, and the transmission is referred to as orthogonal frequency division multiplexing (OFDM). Please note that this is due to the particular choice of T' and $\omega_k$, the quantity $\omega_T/\omega_T$ can be considered as "excess bandwidth" of the shaping filter p(t):

$$\omega_{k+1} - \omega_k = \omega_{T'} = (1+\alpha)\omega_T$$

Figure 5:
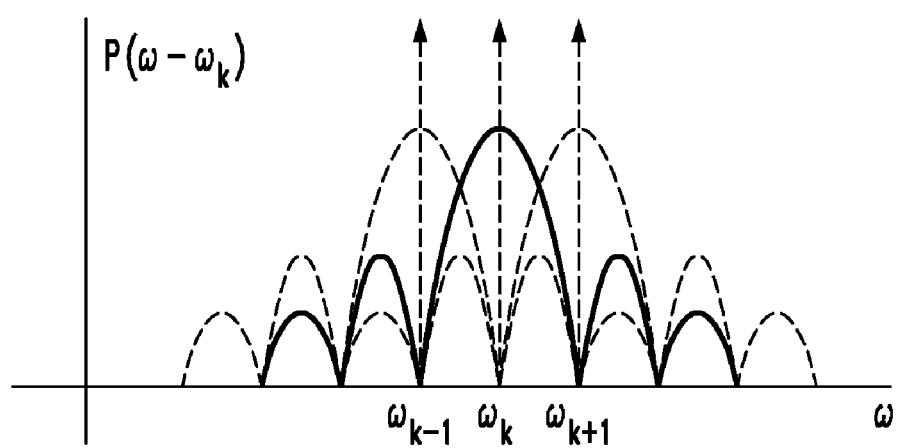
FIG. 5 illustrates three adjacent carrier signals and their corresponding image bands following filtering by a pulse shaping filter p(t) embodied as a rectangular function of duration T'.

FIG. 5 illustrates three adjacent carrier signals, $\omega$, $\omega_k$, $\omega_{k+1}$, and their corresponding image bands following filtering by the rectangular function pulse shaping filter p(t). In the above analysis, orthogonality is achieved for a specific sampling instant, however in practice other considerations make the use of this approach impractical. Since transmit and receive filters are not very selective, the considerable cross-talk energy due to adjacent channels tends to considerably reduce the well-known eye opening at the receiver side (except around the correct sampling time), and hence causes very little tolerance to high frequency or random timing jitter.

It was observed that coarse filters, such as the transmit pulse shaping filter p(t) being embodied as a continuous-time third order Butterworth filter, and the receive matched filter being embodied as a continuous-time fifth order Butterworth, demonstrated degraded performance at the correct sampling time due to intersymbol interference, but the greater selectivity of the coarse filters provided a much wider eye opening making the receiver 150 more tolerant to random timing jitter.

Figure 6:
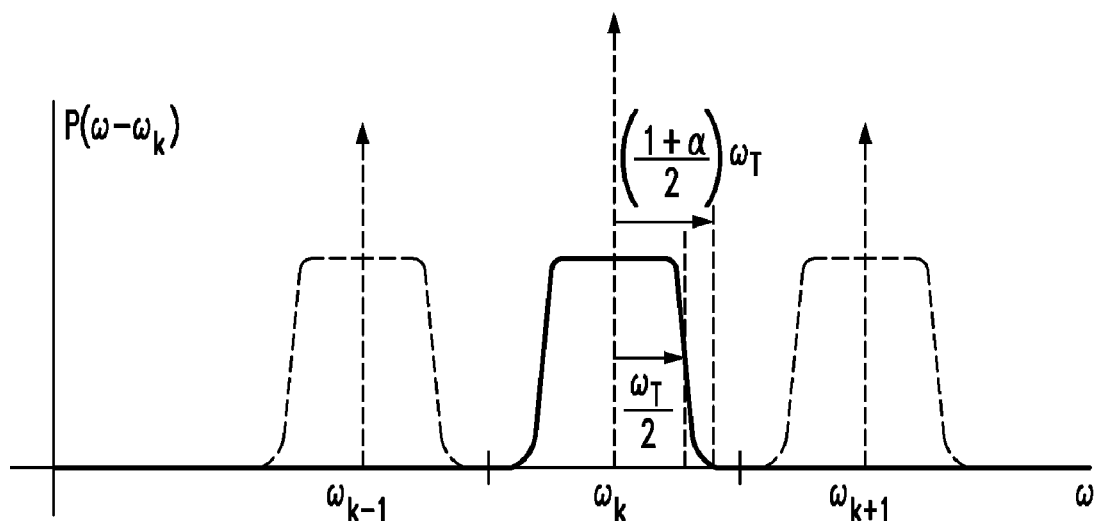
FIG. 6 illustrates three adjacent carrier signals following filtering by a pulse shaping filter p(t) embodied as a square root raised cosine filter of period T.

When the pulse shaping filters p(t) and the corresponding matched filters p(−t) are embodied as square root raised cosine filters of period T, and excess bandwidth α, each carrier frequency is better isolated, as shown in FIG. 6 for three adjacent carrier signals, $\omega$, $\omega_k$, $\omega_{k+1}$. As indicated above, $$a_{j,k}(t) = \int p(v)p(v-t)e^{-i(\omega_j-\omega_k)v} dv$$

By setting f(u) equal to p(u) and g(u) equal to p(u−t), the following is obtained:

$$a_{j,k}(t) = \int v(v)g(v)e^{-i(\omega_j-\omega_k)v} dv$$

In the above expression, the Fourier transform of the product function (f,g) is recognized. This Fourier transform can also be expressed as the convolution of the individual Fourier transforms of F and G, respectively:

$$a_{j,k}(t) = \int F(\omega-\Omega)G(\Omega) d\Omega$$

where F and G are given by:

$$F(\omega-\Omega) = P(\omega-\Omega)$$

$$G(\Omega) = \int p(v-t)e^{-i\Omega v} dv = e^{-i\Omega t} \cdot \int p(u)e^{-i\Omega N} du = e^{-i\Omega t} \cdot P(\Omega)$$

Therefore, $$a_{j,k}(t) = \int P((\omega_j-\omega_k)-\Omega)P(\Omega)e^{-i\Omega t} d\Omega$$

The raised-cosine pulse is defined as follows:

$$c(t) = \left(\frac{\sin(\pi \cdot t/T)}{t/T}\right)\left(\frac{\cos(\alpha\pi \cdot t/T)}{1-(2\alpha t/T)^2}\right)$$

and its Fourier transform is expressed as, $$C(\omega) = \begin{cases} T & 0 \leq |\omega| \leq (1-\alpha)\pi/T \\ \frac{T}{2}\left[1 - \sin\left(\frac{T}{2\alpha}\left(|\omega| - \frac{\pi}{T}\right)\right)\right] & (1-\alpha)\pi/T \leq |\omega| \leq (1+\alpha)\pi/T \\ 0 & |\omega| > (1+\alpha)\pi/T \end{cases}$$

If p(t) is embodied as the square root raised cosine then:

$$P(\omega) = \sqrt{C(\omega)}$$

If the following is assumed for all j and k:

$$|\omega_j - \omega_k| > 2(1+\alpha)\pi/T, \text{ if } j \neq k$$

then using the above frequency domain expression of a, the following is obtained:

$$a_{j,k}(t) = \int P((\omega_j-\omega_k)-\Omega)P(\Omega)e^{-i\Omega t} d\Omega = 0 \text{ if } \omega_j \neq \omega_k$$

Similarly, (assuming that all carrier frequencies are non-zero):

$$\forall (j,k) b_{j,k}(t) = 0$$

and:

$$a_{j,j}(t) = \int P^2(\Omega)e^{-i\Omega t} d\Omega = \int C(\Omega)e^{-i\Omega t} d\Omega = \int C(\Omega)e^{+i\Omega t} d\Omega = c(t)$$

and therefore:

$$a_{j,j}(mT) = c(mT)$$

It is noted that:

$$a_{j,j}(mT) = 0 \text{ if } m \neq 0$$

Figure 7:
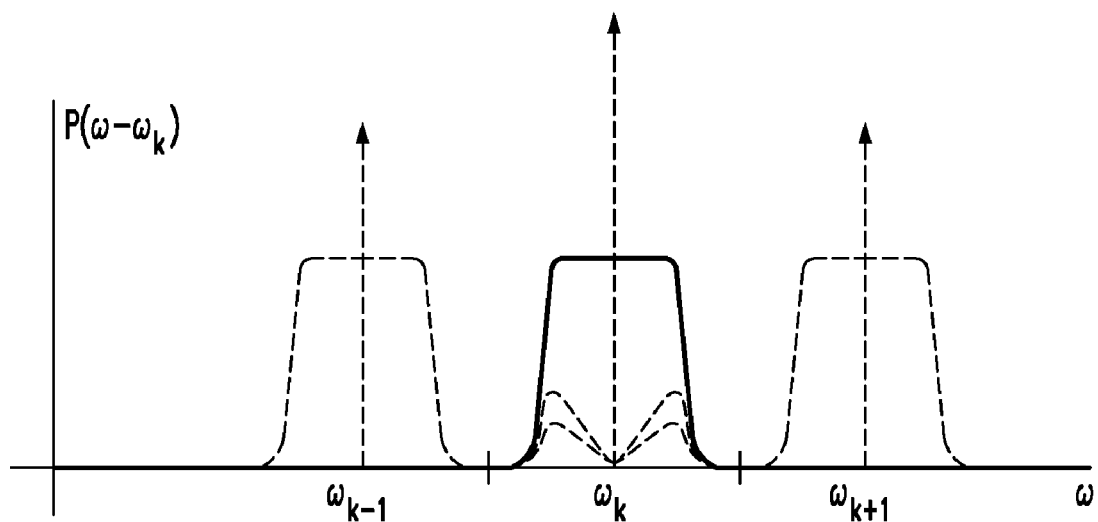
FIG. 7 illustrates a particular example of a pulse shaping filter p(t) embodied as a square root raised cosine filter of period T.

Again, under these assumptions of the pulse shaping filter, p(t), the transmission is orthogonal (OFDM). However in practice, the pulse shape is realized in the sampled domain, and due to speed limitations, it is desirable to limit oversampling to 2-4×. For instance, if the baudrate equals 666 MBaud, the minimum D/A sampling rate required with T/2 fractional spacing would be 1.3 GS/s which is already quite high. The example shown in FIG. 7 illustrates the case where a equals 30%, with T/2 fractional spacing. It is noted that the cross-talk energy from image bands due to the D/A sampling rate is not negligible, and unless image bands are totally suppressed, in practice, the FDM transmission is not cross-talk free. Image bands, however, can be considerably reduced by either T/4 or T/8 fractional spacing and simple RC continuous-time filtering or T/2 fractional spacing combined with more selective continuous-time filters. The carrier spacing in accordance with the present invention may be uniform or non-uniform. In addition, the overlapping frequency bands can use synchronous or asynchronous clocks.

Figure 8:
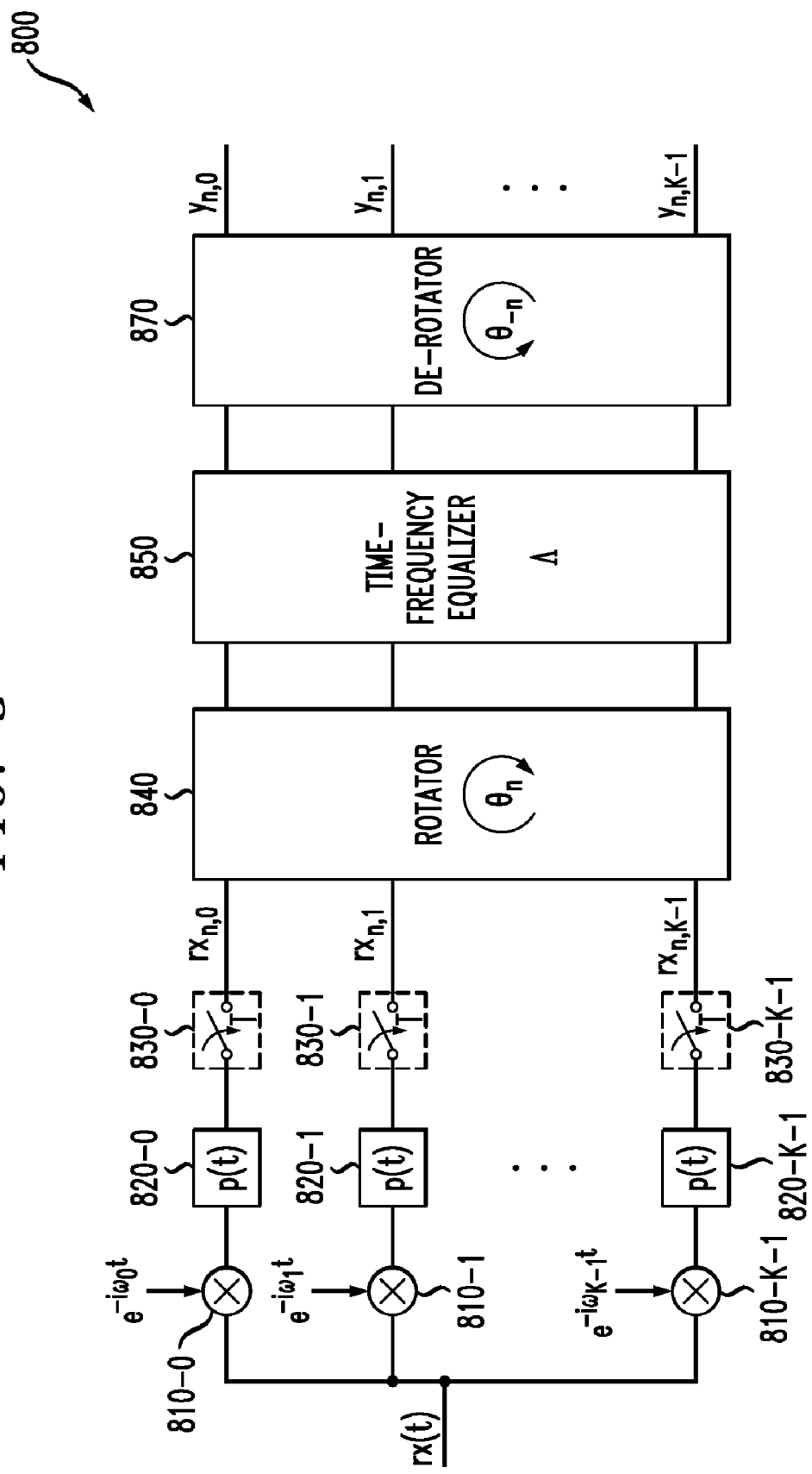
FIG. 8 is a schematic block diagram of a receiver 800 incorporating a cross-talk cancellation scheme in accordance with the present invention.

FIG. 8 is a schematic block diagram of a receiver 800 incorporating a cross-talk cancellation scheme in accordance with the present invention. As shown in FIG. 8, the receiver 800 receives the broadband RF signal rx(t). The input broadband signal is then decomposed into K frequency bands and returned to baseband using an array of input multipliers 810-0 through 810-K−1. Thereafter, each of the K baseband signals is filtered by a corresponding pulse shaping filter p(t) 820-0 through 820-K−1 and sampled by a corresponding switch 830-0 through 830-K−1 at a sampling period, T, to produce the sampled signal elements, $rx_{n,0}$ through $rx_{n,K-1}$.

A rotator 840 in the receiver 800 removes the rotation introduced in the sampled signal elements, $rx_{n,0}$ through $rx_{n,K-1}$, by the multipliers 810 in the receiver 800. A time-frequency analyzer 850 cancels the cross-talk and equalizes the channel 140, in a manner discussed further below in conjunction with FIG. 9. A rotator 870 in the receiver 800 removes the rotation introduced in the signal by the multipliers 120 in the transmitter 110, to produce the digitized signal $y_{n,0}$ through $y_{n,K-1}$ (K samples at a time). It is noted that the following notation is used in FIG. 8 and elsewhere in the present application:

$$\Theta_{n,j,k} = \delta_{j,k} e^{-i\omega jnT}$$

Figure 9:
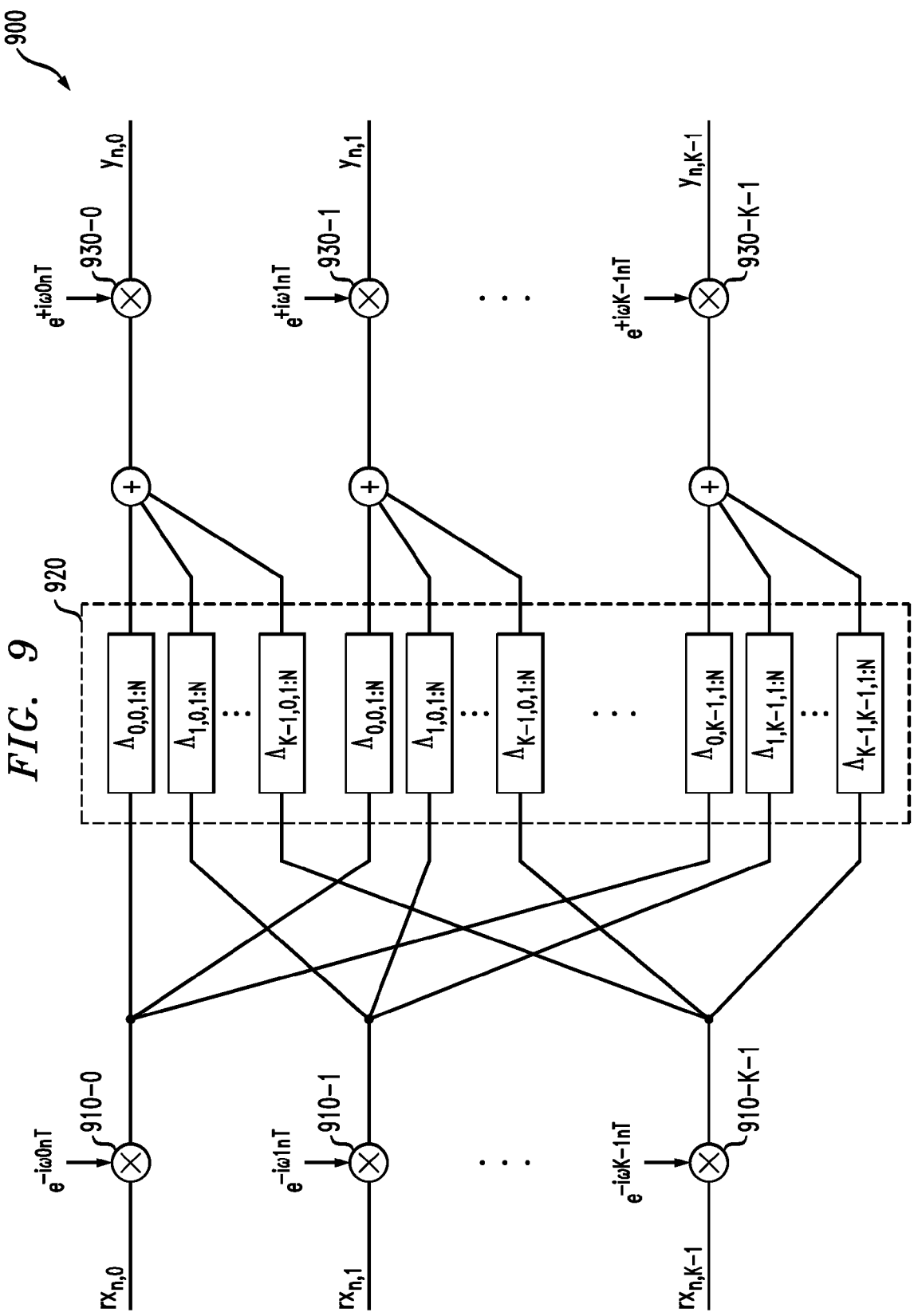
FIG. 9 is a schematic block diagram illustrating the cross-talk cancellation scheme of FIG. 8 in further detail.

FIG. 9 is a schematic block diagram illustrating the cross-talk cancellation scheme of FIG. 8 in further detail. As shown in FIG. 9, the rotator 840 of FIG. 8 is embodied as an array of multipliers 910-0 through 910-K−1, to remove the rotation introduced in the sampled signal elements, $rx_{n,0}$ through $rx_{n,K-1}$, by the multipliers 810 in the receiver 800. The time-frequency analyzer 850 of FIG. 8 is embodied as an array 920 of parallel time domain filters comprised of K filters for each of the K frequency bands to cancel the cross-talk and equalizes the channel 140. The rotator 840 of FIG. 8 is embodied as an array of multipliers 930-0 through 930-K−1, to remove the rotation introduced signal by the multipliers 120 in the transmitter 110, to produce the digitized signal $y_{n,0}$ through $y_{n,K-1}$ (K samples at a time).

Each time domain filter in the array 920, represented as $\Lambda_{j,k,1:N}$, is an N-tap filter with the following z-transform:

$$\Lambda_{j,k,1:N}(z) = \lambda_{j,k,0} \cdot z^0 + \lambda_{j,k,1} \cdot z^{-1} + \ldots \lambda_{j,k,N-1} \cdot z^{-(N-1)}$$

Figure 10:
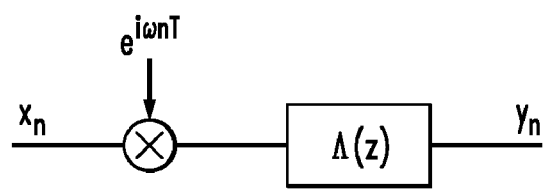
FIG. 10 illustrates a rule that may be employed to simplify the structure of FIG. 9.

In a discrete-time system, the modulator and $\Lambda$ can be permutated following the rule shown in FIG. 10, where:

$$\Lambda(z) = \lambda_0 \cdot z^0 + \lambda_1 \cdot z^{-1} + \ldots \lambda_{N-1} \cdot z^{-(N-1)}$$

Thus, $$y_n = \lambda_0 \cdot e^{i\omega nT} x_n + \lambda_1 \cdot e^{i\omega(n-1)T} x_{n-1} + \ldots + \lambda_{N-1} \cdot e^{i\omega(n-N+1)T} x_{n-N+1}$$

$$y_n = e^{i\omega nT} \cdot (\lambda_0 \cdot e^{-i\omega 0T} x_n + \lambda_1 \cdot e^{-i\omega 1T} x_{n-1} + \ldots + \lambda_{N-1} \cdot e^{-i\omega(N-1)T} x_{n-})$$

Figure 11:
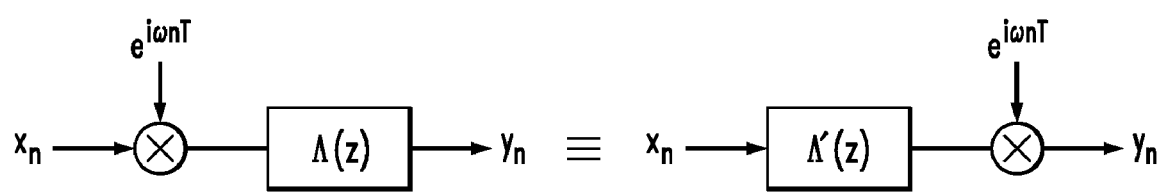
FIG. 11 employs the rule of FIG. 10 to illustrate two equivalent representations of the filter structures of FIG. 9.

FIG. 11 employs the rule of FIG. 10 to illustrate two equivalent representations of the filter structures, where:

$$\Lambda'(z) = \lambda_0 \cdot e^{-i\omega 0T} \cdot z^0 + \lambda_1 \cdot e^{-i\omega 1T} \cdot z^{-1} + \ldots + \lambda_{N-1} \cdot e^{-\omega(N-1)T} \cdot z^{-(N-1)}$$

Figure 12:
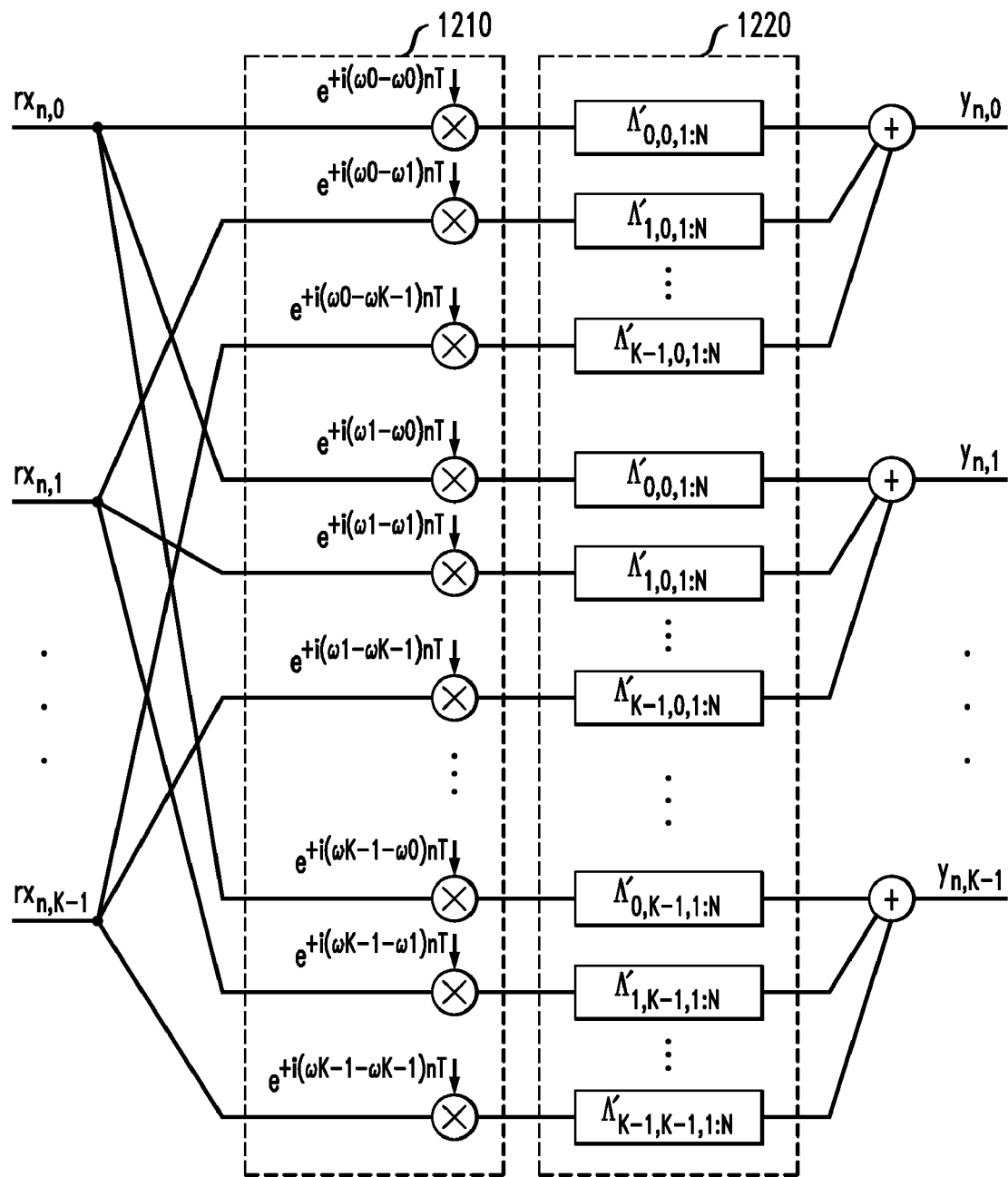
FIG. 12 is a schematic block diagram of one variation of the cross-talk cancellation scheme of FIG. 9.

Equivalent forms of the structure of FIG. 9 can be obtained by permuting the order of filters and rotators or de-rotators. For instance, an equivalent form is obtained by exchanging the order of the filters and the output de-rotators. FIG. 12 is a schematic block diagram of one variation of the cross-talk cancellation scheme of FIG. 9. As shown in FIG. 12, the multipliers 910 and 930 for each frequency band have been integrated into a single multiplier 1210 associated with each of the K filters for each of the K frequency bands. In addition, each filter in the array 920 from FIG. 9 has been replaced with an equivalent filter in an array 1220, represented as $\Lambda'_{j,k,1:N}$, an N-tap filter with the following z-transform:

$$\Lambda'_{j,k,1:N}(z) = \lambda_{j,k,0} \cdot e^{i\omega \kappa 0T} \cdot z^0 + \lambda_{j,k,1} \cdot e^{i\omega \kappa 1T} \cdot z^{-1} + \ldots + \lambda_{j,k,N-1} \cdot e^{i\omega \kappa (N-1)T} \cdot z^{-(N-1)}$$

Figure 13:
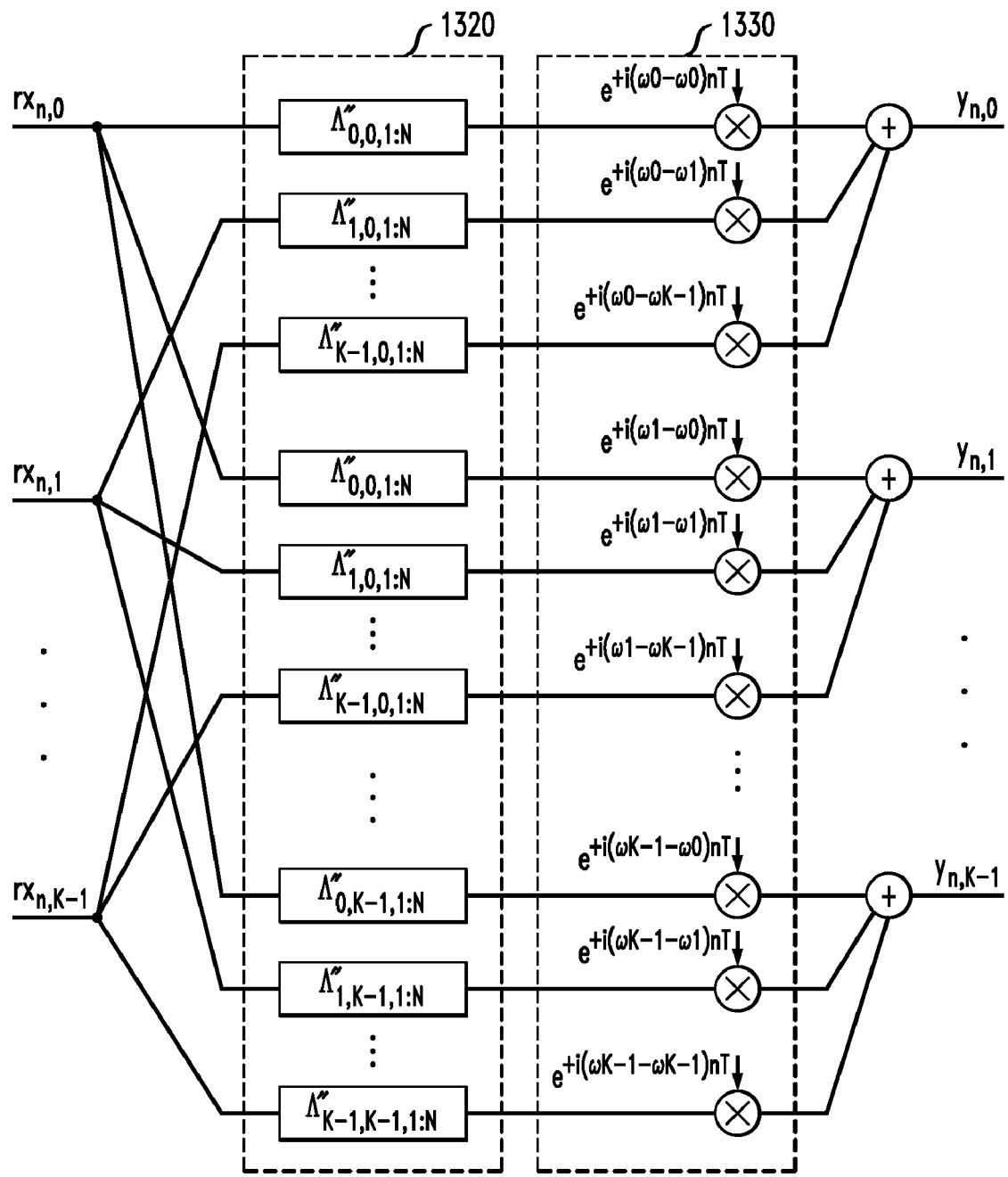
FIG. 13 is a schematic block diagram of another variation of the cross-talk cancellation scheme of FIG. 9.

FIG. 13 is a schematic block diagram of another variation of the cross-talk cancellation scheme of FIG. 9 that exchanges the order of the filters and the input rotators. As shown in FIG. 13, the multipliers 910 and 930 for each frequency band have been integrated into a single multiplier 1330 (following the filters) associated with each of the K filters for each of the K frequency bands. In addition, each filter in the array 920 from FIG. 9 has been replaced with an equivalent filter in an array 1320, represented as $\Lambda''_{j,k,1:N}$, an N-tap filter with the following z-transform:

$$\Lambda''_{j,k,1:N}(z) = \lambda_{j,k,0} e^{+i\omega \kappa 0T} \cdot z^0 + \lambda_{j,k,1} \cdot e^{i\omega \kappa 1T} \cdot z^{-1} + \ldots \lambda_{j,k,N-1} \cdot e^{i\omega \kappa (N-1)T} \cdot z^{-(N-1)} = \Lambda'_{j,k,1:N}(z)$$

Figure 14:
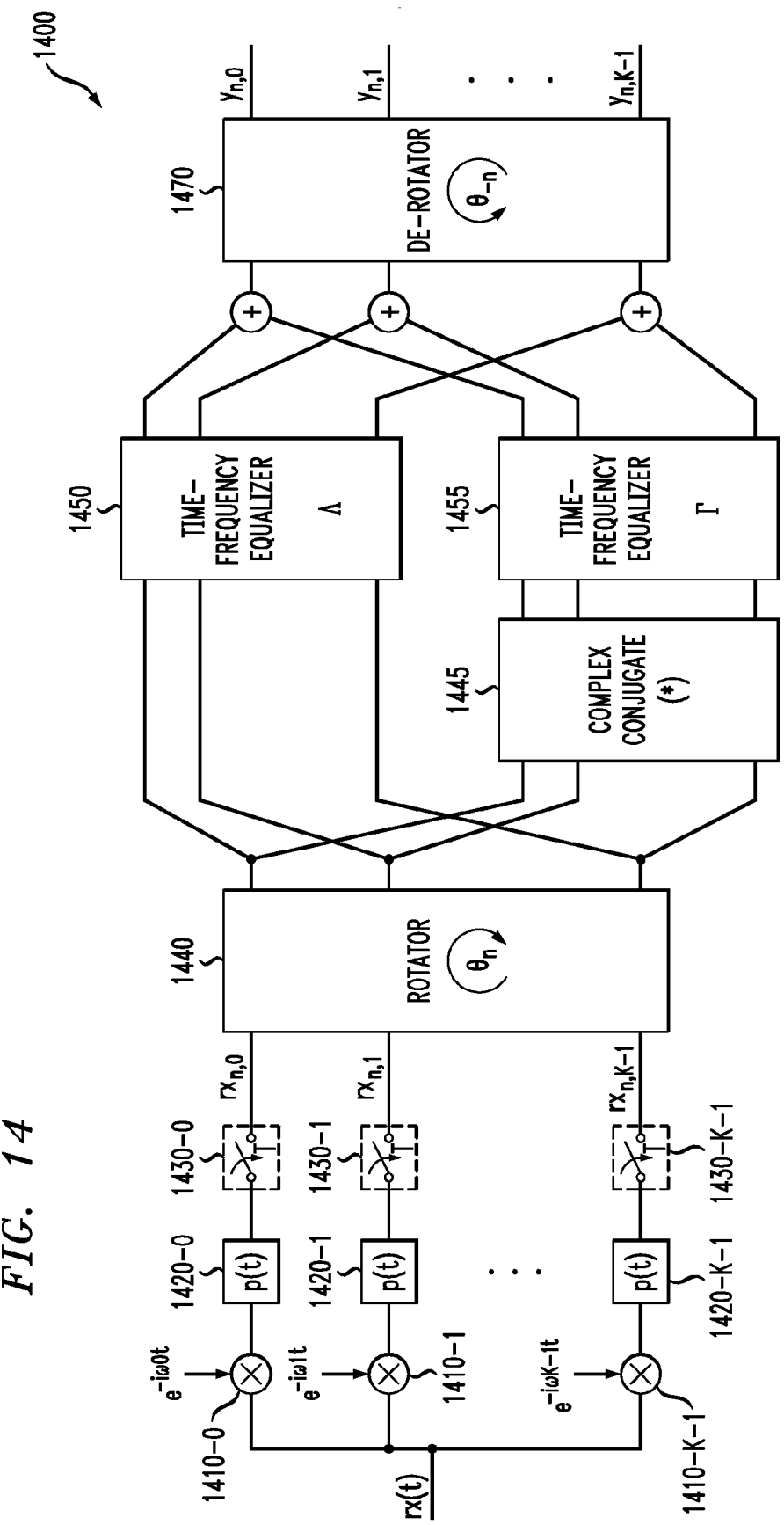
FIG. 14 is a schematic block diagram of a receiver incorporating a generalized cross-talk cancellation/equalization scheme in accordance with the present invention.

FIG. 14 is a schematic block diagram of a receiver 1400 incorporating a generalized cross-talk cancellation/equalization scheme in accordance with the present invention. Generally, the receiver 1400 has a similar structure to the receiver 800 of FIG. 8, with an added lower section to remove the undesired image bands. As shown in FIG. 14, the receiver 1400 receives the broadband RF signal rx(t). The input broadband signal is then decomposed into K frequency bands and returned to baseband using an array of input multipliers 1410-0 through 1410-K−1. Thereafter, each of the K baseband signals is filtered by a corresponding pulse shaping filter p(t) 1420-0 through 1420-K−1 and sampled by a corresponding switch 1430-0 through 1430-K−1 at a sampling period, T, to produce the sampled signal elements, $rx_{n,0}$ through $rx_{n,K-1}$.

A rotator 1440 in the receiver 1400 removes the rotation introduced in the sampled signal elements, $rx_{n,0}$ through $rx_{n,K-1}$, by the multipliers 140, in the receiver 1400. A time-frequency equalizer 1450 cancels the cross-talk and equalizes the channel 140, in a similar manner to the time-frequency equalizer 850 discussed above in conjunction with FIG. 8. A de-rotator 1470 in the receiver 1400 removes the rotation introduced in the signal by the multipliers 120 in the transmitter 110, to produce the digitized signal $y_{n,0}$ through $y_{n,K-1}$ (K samples at a time). It is noted that the following notation is used in FIG. 14 and elsewhere in the present application:

$$\Theta_{n,j,k} = \delta_{j,k} e^{-i\omega jnT}$$

As shown in FIG. 14, the generalized receiver 1400 also includes a second time-frequency equalizer 1455 cancels the undesired image bands and is applied to the complex conjugate (1445) of the rotated signal. It is noted that the second time-frequency equalizer 1455 has the same structure as the time-frequency equalizer 1450 with different coefficients.

It is noted that the architecture of FIG. 14 seem to have double complexity. However, using the following property the complexity is generally not increased in terms of the number of required real multiplications, and that the update part has a negligible complexity increase if the baud-rate update is not used.

$$\Lambda(x+jy)+\Gamma(x-jy)=(\Lambda+\Gamma)x+j(\Lambda-\Gamma)y=\Lambda'x+j\Gamma'y$$

It is noted that the tight side of the above expression comprises two multiplications of complex and real numbers, thus equaling four real multiplications.

The least mean square (LMS) update algorithm for the generalized adaptive filters of FIG. 14 can therefore be written as follows:

$$\Lambda_{n+1}=\Lambda_n+\mu e_n \text{real}(x_n)$$

$$\Gamma'_{n+1}=\Gamma'_n+\mu e_n \text{real}(x_n)$$

In a more detailed form:

$$\text{real}(\Lambda_{n+1})=\text{real}(\Lambda_n)+\mu\text{real}(e_n)\text{real}(x_n)$$

$$\text{imag}(\Lambda_{n+1})=\text{imag}(\Lambda_n)+\mu\text{imag}(e_n)\text{real}(x_n)$$

$$\text{real}(\Gamma_{n+1})=\text{real}(\Gamma'_n)+\mu\text{real}(e_n)\text{imag}(x_n)$$

$$\text{imag}(\Gamma_{n+1})=\text{imag}(\Gamma_n)+\mu\text{imag}(e_n\text{imag}(x_n)$$

This modified LMS update algorithm has the added feature that it provides compensation for a fairly large I/Q phase and gain mismatch in the analog component. This is possible because of the added two degrees of freedom.

It is to be understood that the embodiments and variations shown and described herein are merely illustrative of the principles of this invention and that various modifications may be implemented by those skilled in the art without departing from the scope and spirit of the invention. For example, additional filters can be employed in the transmitter to provide additional resilience to cross-talk, in a known manner. In addition, while the exemplary embodiment shown in FIG. 9 employs both input rotation and output rotation, it is noted that the present invention can be employed with only one of the input rotation and output rotation, as would be apparent to a person of ordinary skill in the art (as illustrated in FIGS. 11-13).

I claim:

1. A method for communicating one or more data signals, said method comprising the steps of:

modulating said one or more data signals onto a plurality of frequency bands to produce a frequency division multiplexed signal, wherein said frequency bands are overlapping with cross-talk between at least two adjacent frequency bands; and transmitting said frequency division multiplexed signal over a fiber channel.

2. The method of claim 1, wherein said overlapping frequency bands have a carrier spacing that approaches a Nyquist limit.

3. The method of claim 1, further comprising the step of employing a multiple level transmission scheme.

4. The method of claim 1, wherein said overlapping frequency bands have a non-uniform carrier spacing.

5. The method of claim 1, wherein said overlapping frequency bands have a uniform carrier spacing.

6. The method of claim 1, wherein said overlapping frequency bands use synchronous clocks.

7. The method of claim 1, wherein said overlapping frequency bands use asynchronous clocks.

8. The method of claim 1, further comprising the step of removing cross-talk at a receiver.

9. The method of claim 1, further comprising the step of removing cross-talk at a transmitter.

10. An integrated circuit, comprising:

RF carrier modulators for modulating one or more data signals onto a plurality of frequency bands to produce a frequency division multiplexed signal, wherein said frequency bands are overlapping with cross-talk between at least two adjacent frequency bands; and a driver for generating a signal that drives a light source that transmits said frequency division multiplexed signal over a fiber channel.

11. A system for communicating one or more data signals, said system comprising:

a modulator for modulating said one or more data signals onto a plurality of frequency bands to produce a frequency division multiplexed signal, wherein said frequency bands are overlapping with cross-talk between at least two adjacent frequency bands; and a light source for transmitting said frequency division multiplexed signal over a fiber channel.

12. The system of claim 11, further comprising a cross-talk canceller at a receiver.

13. The system of claim 11, further comprising a cross-talk canceller at a transmitter.

* * * * *